United States Patent
Kim

(10) Patent No.: US 9,874,941 B2
(45) Date of Patent: Jan. 23, 2018

(54) SLIDING-TYPE SIGNAL INPUT DEVICE

(71) Applicant: ITVERS CO., LTD., Seoul (KR)

(72) Inventor: Youn Soo Kim, Seoul (KR)

(73) Assignee: ITVERS CO., LTD., Seoul (KR)

( * ) Notice: Subject to any disclaimer, the term of this patent is extended or adjusted under 35 U.S.C. 154(b) by 386 days.

(21) Appl. No.: 14/423,370

(22) PCT Filed: Aug. 23, 2013

(86) PCT No.: PCT/KR2013/007555
§ 371 (c)(1),
(2) Date: Feb. 23, 2015

(87) PCT Pub. No.: WO2014/030949
PCT Pub. Date: Feb. 27, 2014

(65) Prior Publication Data
US 2015/0301614 A1     Oct. 22, 2015

(30) Foreign Application Priority Data

Aug. 24, 2012   (KR) ........................ 10-2012-0092876

(51) Int. Cl.
*G06F 3/02* (2006.01)
*H01H 13/02* (2006.01)
(Continued)

(52) U.S. Cl.
CPC ........... *G06F 3/0202* (2013.01); *H01H 13/02* (2013.01); *H01H 15/04* (2013.01); *H01H 25/00* (2013.01);
(Continued)

(58) Field of Classification Search
CPC ...... H01H 13/02; H01H 25/00; H01H 25/002; H01H 15/04; H01H 13/79; H01H 2203/02;
(Continued)

(56) References Cited

U.S. PATENT DOCUMENTS

| 2007/0170048 | A1* | 7/2007 | Kondo | ................ | H01H 25/002 |
| | | | | | 200/5 R |
| 2013/0032457 | A1* | 2/2013 | Quinn | .................... | H01H 13/32 |
| | | | | | 200/341 |
| 2014/0110231 | A1* | 4/2014 | Kibiti | .................... | H01H 15/04 |
| | | | | | 200/293 |

FOREIGN PATENT DOCUMENTS

| CN | 1353436 A | 6/2002 |
| CN | 101743605 A | 6/2010 |

(Continued)

OTHER PUBLICATIONS

Office Action dated Jan. 26, 2016 of corresponding Japanese Patent Application No. 2015-528400 and its English translation—7 pages.
(Continued)

*Primary Examiner* — Latanya Bibbins
(74) *Attorney, Agent, or Firm* — Knobbe Martens Olson & Bear LLP

(57) ABSTRACT

A sliding-type signal input device, according to the present invention, includes: a housing having an inner space with an opened upper side; a slide button mounted in the inner space; a flexible printed circuit board which is coupled to enclose an inner wall of the inner space and/or an outer sidewall of the slide button, and which is provided with two or more terminal switches; and a conductor which is arranged to enclose the other one from among the inner wall of the inner space and the outer sidewall of the slide button, and which comes in contact with the terminal switches when the slide button is moved in a lateral direction so as to connect the terminal switches.

19 Claims, 11 Drawing Sheets

(51) Int. Cl.
  *H01H 25/00* (2006.01)
  *H01H 15/04* (2006.01)
  *H01H 13/79* (2006.01)
  *H01H 1/58* (2006.01)

(52) U.S. Cl.
  CPC .......... *H01H 25/002* (2013.01); *H01H 13/79* (2013.01); *H01H 2001/5816* (2013.01); *H01H 2025/004* (2013.01); *H01H 2203/02* (2013.01)

(58) Field of Classification Search
  CPC ...... H01H 2001/5816; H01H 2025/004; G06F 3/0202

See application file for complete search history.

(56) References Cited

FOREIGN PATENT DOCUMENTS

| | | |
|---|---|---|
| JP | 01-103135 U | 7/1989 |
| JP | 08-115637 A | 5/1996 |
| JP | 09-231858 A | 9/1997 |
| JP | 2002-140960 A | 5/2002 |
| JP | 2004-319182 A | 11/2004 |
| JP | 2005228593 A * | 8/2005 |
| JP | 2010-153159 A | 7/2010 |
| JP | 2010-531040 A | 9/2010 |
| KR | 10-2002-0033583 A | 5/2002 |
| KR | 10-2007-0078058 A | 7/2007 |

OTHER PUBLICATIONS

International Search Report dated Nov. 1, 2013 of PCT/KR2013/007555 which is the parent application and its English translation—4 pages.

* cited by examiner

SLIDING-TYPE SIGNAL INPUT DEVICE

TECHNICAL FIELD

The present invention relates to a signal input device configured to generate an input signal when a button is radially slid, and more particularly, to a sliding-type signal input device configured to generate different types of input signals depending on a direction in which the button is slid without a separate pressure sensor.

BACKGROUND ART

Recently, as electronics capable of being remotely controlled, such as smart computers or Internet protocol televisions (IPTVs) are developed, various types of signal input devices to remotely input a signal into the electronics are also provided. Remote controllers are most generally used as the remote signal input devices, and conventional remote controllers are provided with a number of buttons mounted thereon which can control each function of the electronics.

In button embodying methods of the conventional remote controllers, a button having a switch form or a push button form implements a function, and a button having a shortcut function is embodied for various functions of the electronics so as to provide convenience of a user. However, since the number of the buttons is increased to embody a number of functions in one remote controller, there is a trend in that the remote controllers are increased in size and structures of the remote controllers are more complicated. As the structures of the remote controllers are complicated, there is a problem in that using the remote controller is inconvenient, since the user has a difficulty in finding a location of a button having a function of being required.

Meanwhile, a complex button which has two or more functions can be embodied in order to solve the above problem. The complex button is configured to allow a required function to be selected by using an arrow button in a key code converting mode. However, although the complex button has an effect of reducing the number of the function buttons, there is a disadvantage in that reducing the number of buttons is limited since the arrow button is still required, and operation is complicated.

DISCLOSURE

Technical Problem

The present invention is provided to solve the above problems, and is directed to provide a sliding-type signal input device configured to generate different input signals depending on a direction of an applied operating force when the operating force is applied in a lateral direction, so that the operating force applied in the lateral direction can be sensed without a separate pressure sensor.

Technical Solution

One aspect of the present invention to achieve the above object provides a sliding-type signal input device including:
 a housing having an inner space with an opened upper side;
 a slide button mounted in the inner space;
 a flexible printed circuit board which is coupled to surround any one of an inner wall of the inner space and an outer sidewall of the slide button, and is provided with two or more terminal switches; and
 a conductor which is arranged to surround the other one of the inner wall of the inner space and the outer sidewall of the slide button, and comes in contact with and connects the terminal switches when the slide button is moved in a lateral direction.

The sliding-type signal input device may further include an elastic member that returns a position of the slide button so that the terminal switches and the conductor are spaced from each other, after the slide button is moved in the lateral direction.

The slide button may include a lower sidewall extending downward from the outer end thereof, a fixing wall extending upward so as to face an inner side of the lower sidewall may be formed on a bottom surface of the housing, and the elastic member may be inserted between the lower sidewall and the fixing wall.

The inner side of the lower sidewall and an outer side of the fixing wall may include a plurality of planes arranged and connected to each other to make a radial form about a vertical axis, and the elastic member may come in contact with the inner side of the lower sidewall and the outer side of the fixing wall.

The planes of the inner side of the lower sidewall and the outer side of the fixing wall may be disposed at sides corresponding to the terminal switches, and corners of the inner side of the lower sidewall and the outer side of the fixing wall may be disposed at corresponding sides between two adjacent terminal switches.

The slide button may include a lower sidewall extending downward from an outer end thereof, a plurality of fixing rods protruding upward so as to space the housing in a constant distance from an inner side of the lower sidewall may be formed on a bottom surface of the housing, and the elastic member may be inserted between the inner side of the lower sidewall and the plurality of the fixing rods.

The inner side of the lower sidewall may include a plurality of planes arranged and connected to each other so as to define a radial form about a vertical axis.

The inner side of the lower sidewall may be disposed so that the planes of the inner side are disposed at sides corresponding to the terminal switches, and corners of the inner side are disposed at corresponding points between the two adjacent terminal switches, and the plurality of fixing rods may be disposed at points corresponding to the corners of the inner side of the lower sidewall.

The sliding-type signal input device may further include a cover coupled to cover an upper side of the housing, and the slide button may include an upper end protruding upward through the cover, and a lower end that is coupled to a lower side of the upper end, is disposed in the inner space, and is provided with the flexible printed circuit board or the conductor at an outer sidewall thereof.

Fastening jaws may be formed on the outer sidewall of the housing, and fastening grooves may be formed in the cover, wherein free ends of the fastening jaws may be inserted into and hooked at the fastening grooves.

A protrusion may be formed on any one side of the slide button and the cover, and inserting holes into which the protrusions can be inserted may be formed on the other side of the slide button and the cover, so that a rotation of the slide button is prevented.

Another aspect of the present invention provides a sliding-type signal input device including:
 a housing having an inner space with an opened upper side;
 a slide button which is mounted on the upper side of the housing and provided with a lower sidewall extending downward therefrom so as to space the slide button from an outer sidewall of the housing;

a flexible printed circuit board which is coupled to surround any one of the outer sidewall of the housing and an inner side of the lower sidewall, and is provided with two or more terminal switches; and a conductor which is arranged to surround the other one of the outer sidewall of the housing and the inner side of the lower sidewall, and comes in contact with and connects the terminal switches when the slide button is moved in a lateral direction.

The sliding-type signal input device may further include an elastic member that returns a position of the slide button so that the terminal switches and the conductor is spaced from each other, after the slide button is moved in the lateral direction.

The elastic member may be inserted between the outer sidewall of the housing and the lower sidewall.

A surface of the outer sidewall of the housing and the inner side of the lower sidewall may include a plurality of planes arranged and connected to each other to make a radial form about a vertical axis, and the elastic member may come in contact with the surface of the outer sidewall of the housing and the inner side of the lower sidewall.

The terminal switches may be arranged in a radial form about a vertical, central axis of the inner space.

The number of the terminal switches may be set to a multiple of 4.

The flexible printed circuit board may be provided with a dome key mounted on the bottom surface of the housing, and the signal input device may further include a push button having an upper end passing upward through the slide button and a lower end mounted on the dome key.

The push button may include a push rod passing through a through hole formed on the slide button, and a mounting portion that is formed to have a greater horizontal area than the through hole and may be coupled to a lower end of the push rod.

The flexible printed circuit board may include a center line extending in a horizontal direction and a first and a second branch lines extending from the center line in a direction that crosses with a longitudinal direction of the center line, the terminal switches may be formed on the center line, the dome key may be formed on the first branch line, and a connector terminal may be formed on a free end of the second branch line.

The free end of the second branch line may be drawn out to outside of the housing by passing through the housing.

The terminal switches may be configured with positive terminals and negative terminals which are arranged to have portions alternately arranged in a horizontal direction, and a protruding end may be formed at a position on the conductor, wherein the position may correspond to a point at which the positive terminals and the negative terminals are arranged to cross to each other.

The protruding end may be formed over an entire circumference of an outer surface of the conductor.

Positive lines connected to the positive terminals and a negative line connected to the negative terminals may be disposed at an upper side and a lower side of a point of the center line, respectively, at which the terminal switches are formed, and the flexible printed circuit board may further include a protective film attached to cover a zone in which the positive lines and the negative line are disposed.

Protrusions may be formed on any one side of the slide button and the housing and inserting holes into which the protrusions can be inserted may be formed on the other side of the slide button and the cover, so that a rotation of the slide button is prevented.

A movement signal may be generated when the terminal switches are connected, wherein when one terminal switch is connected, a movement signal indicating a direction in which that terminal switch is positioned may be generated, and when two adjacent terminal switches are connected, a movement signal indicating a direction directing a center between regions at which the connected terminal switches are disposed may be generated.

A movement signal indicating a direction directing a center among regions at which the connected terminal switches are disposed may be generated, when at least three adjacent terminal switches are connected.

An edge portion of the slide button may be formed to be higher than a central portion of the slide button.

Advantageous Effects

An sliding-type signal input device according to the present invention can generate different types of input signals according to a direction of an operating force for sliding in a lateral direction such that the number of buttons provided in the signal input device can be reduced, and there is an advantage in that the operating force for sliding in the lateral direction can be sensed even without a separate pressure sensor, thereby simplifying a configuration, remarkably reducing manufacturing costs, and simultaneously generating two or more input signals.

MODES OF THE INVENTION

Hereafter, embodiments of a sliding-type signal input device according to the present invention will be described in detail, with reference to attached drawings.

Figure 1:
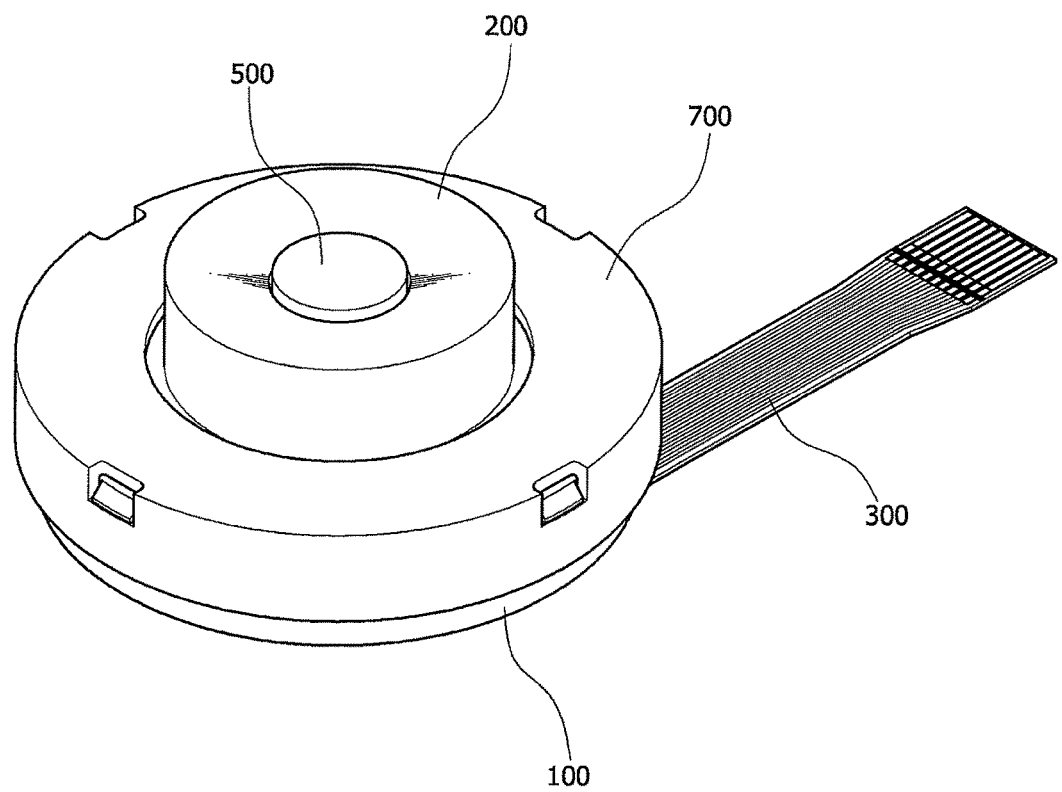
FIG. 1 is a perspective view illustrating a signal input device according to an embodiment of the present invention.
Figure 2:
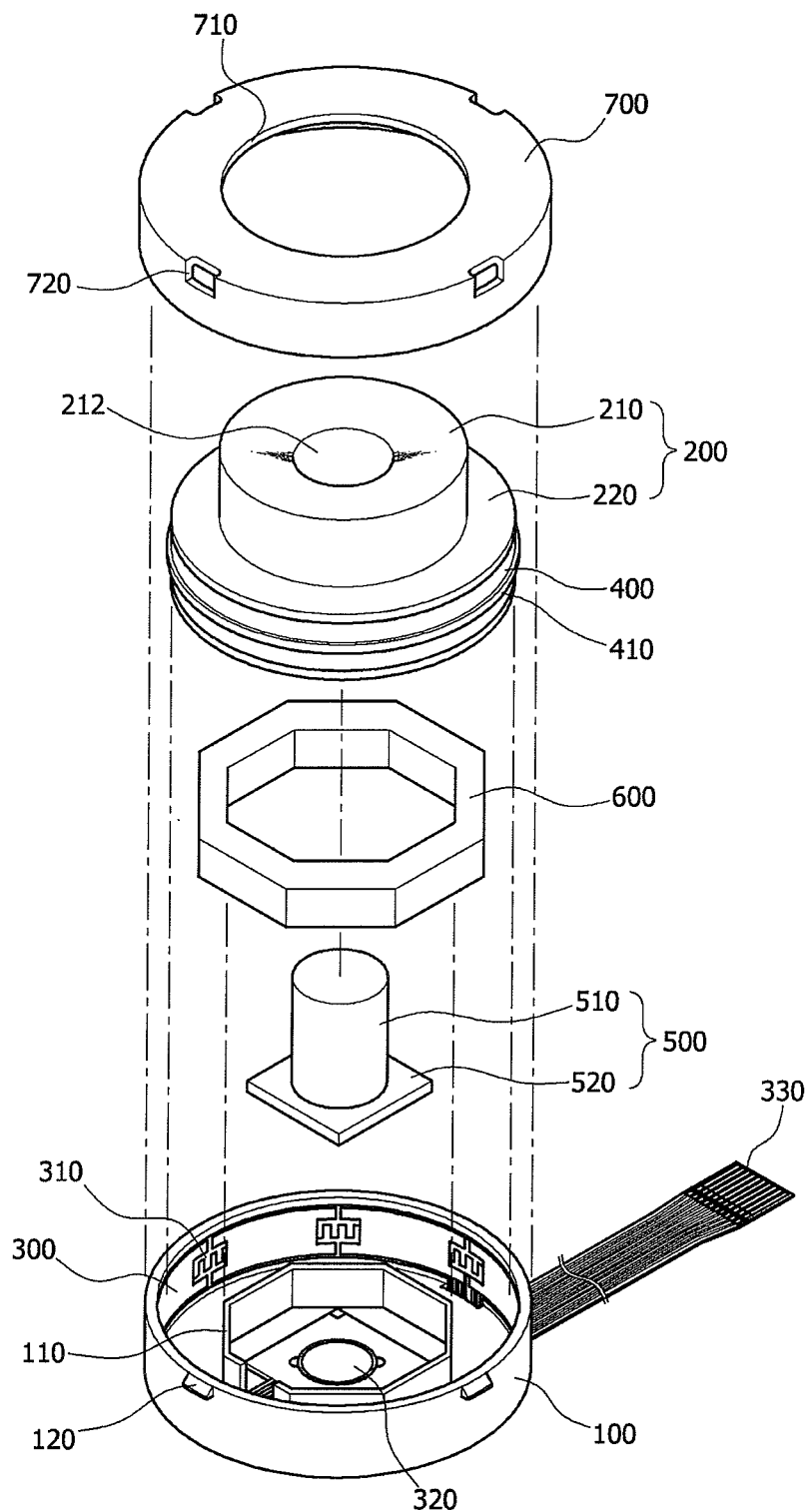
FIG. 2 is an exploded perspective view illustrating the signal input device according to the embodiment of the present invention.
Figure 3:
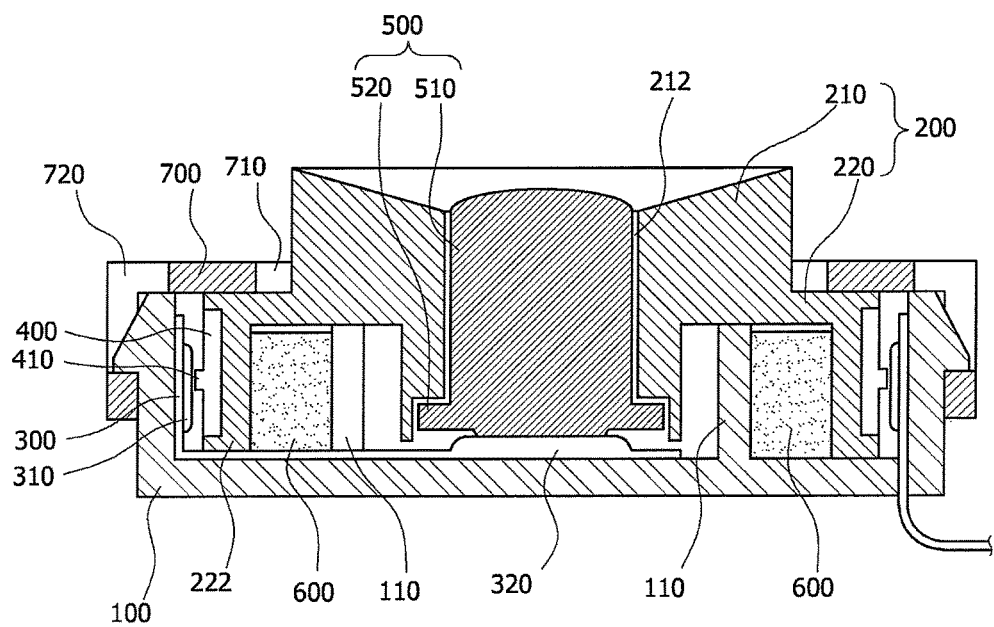
FIG. 3 is a cross sectional view illustrating the signal input device according to the embodiment of the present invention.

FIG. 1 is a perspective view illustrating a signal input device according to an embodiment of the present invention, and FIG. 2 is an exploded perspective view illustrating the signal input device according to the embodiment of the present invention, and FIG. 3 is a cross sectional view illustrating the signal input device according to the embodiment of the present invention.

The signal input device according to the present invention is a device configured to selectively generate various types of input signals with one button, the signal input device including a housing 100 having an inner space with an opened upper side, a flexible printed circuit board 300 which is coupled to surround any one of an inner wall of the inner space and is provided with two or more terminal switches 310, and a conductor 400 which is arranged to surround an outer sidewall of a slide button 200, as shown in FIGS. 1 to 3. The slide button 200 is configured to be moved in lateral direction, such as a front-rear direction and a left-right direction, etc., not in an up-down direction. The conductor 400 comes in contact with and connects the terminal switch 310 disposed in the direction in which the slide button 200 is moved, and an input signal allotted to the connected terminal switch 310 is generated, when a user slides the slide button 200 in the lateral direction.

Various structures of the sliding-type signal input devices in which the input signal is generated when the button is pushed and slid in the lateral direction are already proposed. Those conventional sliding-type signal input devices necessarily requires a pressure sensor to sense a lateral sliding, thereby having a disadvantage in that manufacturing costs are substantially increased. Particularly, when the signal input device is configured to generate different types of input signals depending on the direction in which the button is slid, such a disadvantage of increasing the manufacturing costs gets worse because one pressure sensor should be mounted in each direction in which the sliding force is applied.

Figure 4:
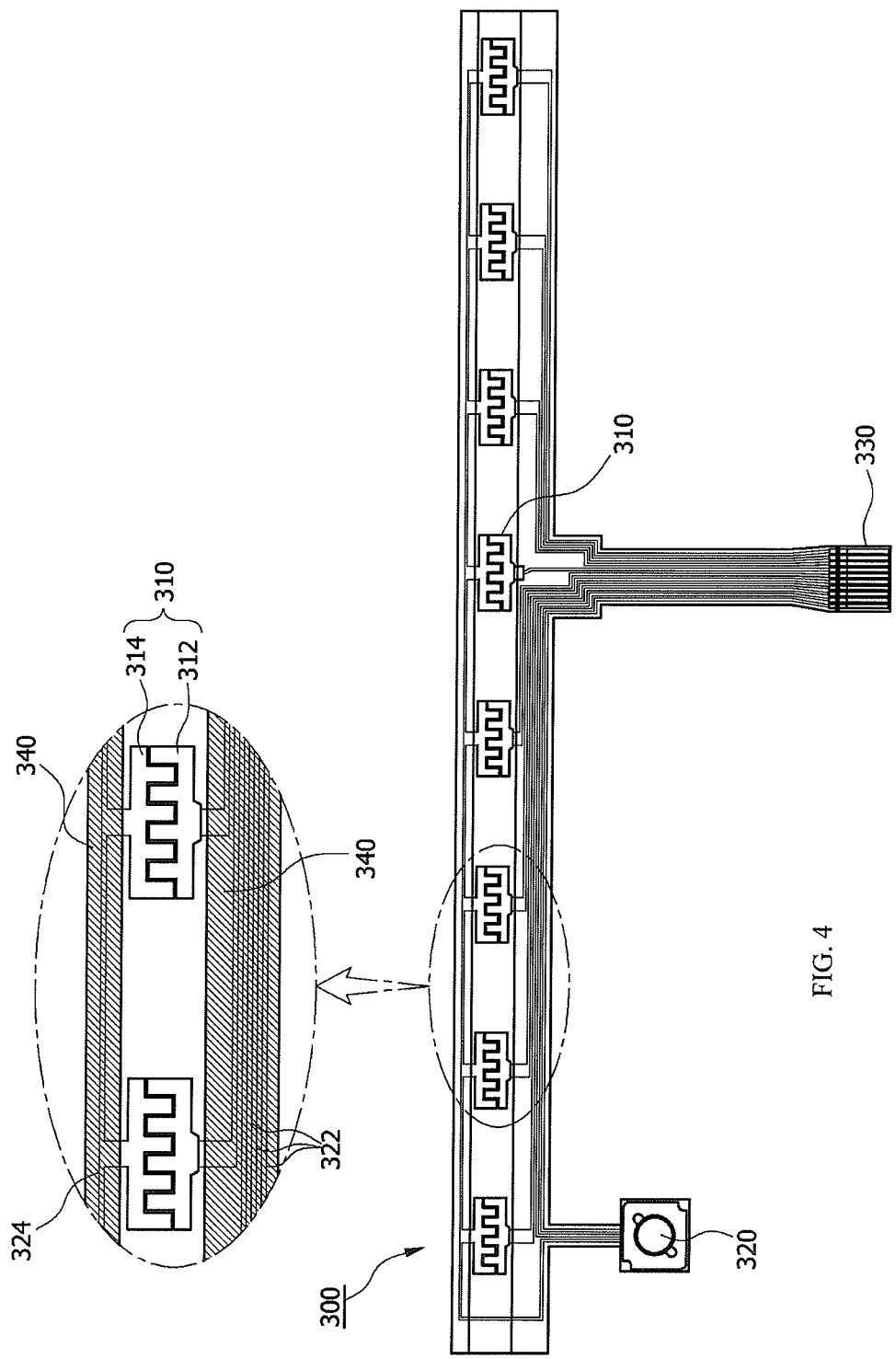
FIG. 4 is a deployed view illustrating a flexible printed circuit board included in the signal input device according to the embodiment of the present invention.

The sliding-type signal input device according to the present invention is provided to solve the above advantages, and has the biggest characteristic in which the sliding-type signal input device is configured to allow the input signal to be generated when the sliding force is applied in a lateral direction without a separate pressure sensor, and to allow different types of input signals from each other to be generated depending on the direction in which the sliding force is applied. That is, the terminal switches 310 included in the sliding-type signal input device according to the present invention are configured to have portions alternately arranged in a horizontal direction as shown in FIG. 4, in other words, the sliding-type signal input device is configured with positive terminals 312 and negative terminals 314 having a concave-convex pattern in a vertical direction, the concave-convex portions of the positive terminals 312 and the negative terminals 314 are arranged to be engaged each other, and the positive terminals 312 and the negative terminals 314 are disposed so that the concave-convex portions are alternately engaged each other and simultaneously configured to be maintained in a slightly spaced state from each other. Accordingly, when the user moves the slide button 200 by sliding it in the lateral direction, the conductor 400 provided on the outer side of the slide button 200 comes in contact with the terminal switches 310, and since the positive terminals 312 and the negative terminals 314 are disposed very closely, the conductor 400 comes in contact with both of the positive terminals 312 and the negative terminals 314 and connects the terminal switches 310, and then an input signal allocated the connected terminal switch 310 is generated.

As described above, the sliding-type signal input device according to the present invention is configured to decide a lateral movement of the slide button 200 based on ON/OFF of the terminal switch 310 printed onto the flexible printed circuit board 300, not by using a separate sensor, and therefore there is an advantage in that decrease in manufacturing costs and weight reduction of a product are possible, because the terminal switch 310 can be made at low manufacturing costs and has a simple structure.

Meanwhile, when the sliding force applied to the slide button 200 is released after the slide button 200 is moved in any one of lateral directions and the conductor 400 connects any one of the terminal switches 310, if the connected state of the terminal switch 310 is sustained, the input signal may be continuously generated against an intention of the user. In order to solve the above problem, the signal input device according to the present invention further includes an elastic member 600 that returns a position of the slide button 200 so that the terminal switch 310 and the conductor 400 are spaced from each other, when the slide button 200 is moved in the lateral direction. When the elastic member 600 is provided as described above, the slide button 200 is returned to its initial position by an elastic force of the elastic member 600 and the terminal switch 310 and the conductor 400 is in a spaced state, i.e. a state in which no input signal is generated, when the lateral external force applied to the slide button 200 is released.

Meanwhile, when the elastic member 600 is provided between a sidewall of the housing 100 and the sidewall of the slide button 200, a limitation in minimizing a product occurs, because heights of the housing 100 and the slide button 200 should be increased to secure a mounting space for the flexible printed circuit board 300 and the conductor 400. Accordingly, it is preferred that the slide button 200 be provided with a lower sidewall 222 extending downward from an outer end thereof, a fixing wall 110 extending upward so as to face an inner side of the lower sidewall 222 may be formed on a bottom surface of the housing 100, and the elastic member 600 is inserted between the lower sidewall 222 and the fixing wall 110. When the elastic member 600 is disposed inside of the lower sidewall 222, there is an advantage that allows a thickness and a height, etc. to be selected depending on various conditions including a magnitude of the sliding force or a weight of the slide button 200, etc., because there is no a concern about interfering the elastic member 600 with other constituents.

At this time, the elastic member 600 is inserted between the lower sidewall 222 and the fixing wall 110 and compressed when the slide button 200 is laterally moved as shown in this embodiment. The elastic member 600 can be employed as an elastic material such as a carbon sponge or silicone that applies a restoring elastic force to the slide button 200, and a spring that is disposed between the housing 100 and the slide button 200 and applies an elastic force in a direction in which the slide button 200 is returned into its initial state. A detailed description of the elastic member 600 is omitted because the elastic member 600 to return a movable part to its initial position is widely used in the technical fields of the invention.

Further, when the slide button 200 is configured to rotate about a vertical, rotational axis thereof, a phenomenon in which the slide button 200 is slid in a direction that is not desired by the user may occur by the rotation of the slide button 200 while the slide button 200 is slid in the lateral direction, thereby causing a difficulty in operating. Accordingly, the inner side of the lower sidewall 222 and an outer side of the fixing wall 110 include a plurality of planes arranged and connected to each other to make a radial form about a vertical axis (a vertical, central axis of the slide button 200 in this embodiment), and the elastic member 600 comes in contact with the inner side of the lower sidewall 222 and the outer side of the fixing wall 110, so that the slide button 200 cannot be rotated about the vertical, rotational axis. When the inner side of the lower sidewall 222 and the outer side of the fixing wall 110 form a polygon as seen from the above and the elastic member 600 inserted between the inner side of the lower sidewall 222 and the outer side of the fixing wall 110 is also formed in a polygonal ring, a portion of the elastic member 600 (more specifically, corresponding to a bended portion on the outer side of the fixing wall 110) is excessively compressed when it is intended to rotate the slide button 200 about the vertical, rotational axis, and functions to prevent the slide button 200 from being rotated. Meanwhile, protrusions may be formed on any one side of the slide button 200 and the housing 100 and inserting grooves into which the protrusions can be inserted are formed on the other side of the slide button 200 and the housing 100, so that the rotation of the slide button 200 is prevented. In this case, when the protrusions are inserted into the inserting grooves in a press-fit manner, since the slide button 200 cannot be laterally moved in a mounted state in the housing 100, it is preferred that the inserting grooves be formed greater than the protrusions.

Further, if the inner side of the lower sidewall 222, the outer side of the fixing wall 110, and a horizontal cross section of the elastic member 600 are formed in polygonal shapes, the sliding direction of the slide button 200 is not biased in a right or left direction when the slide button 200 is slid in a direction in which a side of the slide button 200 is disposed, but the sliding direction of the slide button 200 may be biased in a right or left direction when the slide button 200 is pushed in a direction in which an apex of the slide button 200 is disposed. The slide button 200 is laterally slid so as to make a contact between the conductor 400 and the terminal switch 310. However, a secure connection of the terminal switch 310 may not be obtained, when the sliding direction of the slide button 200 is biased in a left or right direction as described above.

Accordingly, it is preferred that planes of the inner side of the lower sidewall 222 and the outer side of the fixing wall 110 be disposed at a side corresponding to the terminal switch 310, and corners of the inner side of the lower sidewall 222 and the outer side of the fixing wall 110 be disposed at corresponding points between two adjacent terminal switches 310. In other words, it is preferred that the inner side of the lower sidewall 222 and the outer side of the fixing wall 110 be formed in a shape in which 8 planes are arranged in a radial form about the vertical, central axis, i.e. a horizontal cross section in an octagon shape is formed, when 8 terminal switches 310 are provided, as shown in this embodiment.

Since the slide button 200 can be easily removed in an upward direction when the slide button 200 is configured to be simply mounted into the housing 100, a cover 700 coupled to cover an upper side of the housing 100 is further included, and the slide button 200 is configured to include an upper end 210 protruding upward through the cover 700 and a lower end 220 that is coupled the upper end 210 and is disposed in the inner space of the housing 100. When the slide button 200 is distinguished into the upper end 210 and the lower end 220 as described above, the conductor 400 should be provided on an outer side of the lower end 220 which corresponds to the inner wall of the inner space. At this time, in order to allow the cover 700 to be coupled to the housing 100 in a removable manner without a separate fastening element, it is preferred that fastening jaws 120 be formed on the outer sidewall of the housing 100, and fastening grooves 720 be formed in the cover, wherein free ends of the fastening jaws 120 are inserted into and hooked at the fastening grooves. A detailed description of a fastening structure of the fastening jaws 120 and the fastening grooves 720 is omitted because the fastening jaws 120 and the fastening grooves 720 are widely used in an ordinary life as well as the technical fields of the invention. In addition, when a separate cover 700 is provided as shown in this embodiment, protrusions are formed on any one side of the slide button 200 and the cover 700 and inserting holes into which the protrusions can be inserted are formed on the other side of the slide button 200 and the cover 700, so that a phenomenon in which the slide button 200 rotates about the vertical, rotational axis is prevented.

Meanwhile, although only a structure in which the flexible printed circuit board 300 is mounted on the housing 100 and the conductor 400 is mounted on the slide button 200 is shown in this embodiment, mounting positions of the flexible printed circuit board 300 and the conductor 400 are interchangeable. Further, although only a condition in which the lower sidewall 222 of the slide button 200 is disposed in the inside of the housing 100 is described in this embodiment, the slide button 200 can be formed in a large size sufficient to cover the entire upper side of the housing 100, so that the lower sidewall 222 is disposed at an outside of the housing 100, in other words, the lower sidewall 222 faces the outer sidewall of the housing 100. When the lower sidewall 222 is disposed at the outside of the housing 100 as described above, the flexible printed circuit board 300 should be coupled to surround any one of the outer sidewall of the housing 100 and the inner side of the lower sidewall 222, and the conductor 400 should be arranged to surround the other one of the outer sidewall of the housing 100 and the inner side of the lower sidewall 222. In addition, in this case, the elastic member 600 can be inserted between the outer sidewall of the housing 100 and the lower sidewall 222, and horizontal cross sections of a surface of the outer sidewall of the housing 100 and the inner side of lower sidewall 222 can be formed in a polygonal shape in order to prevent the rotation of the slide button 200.

Figure 5:
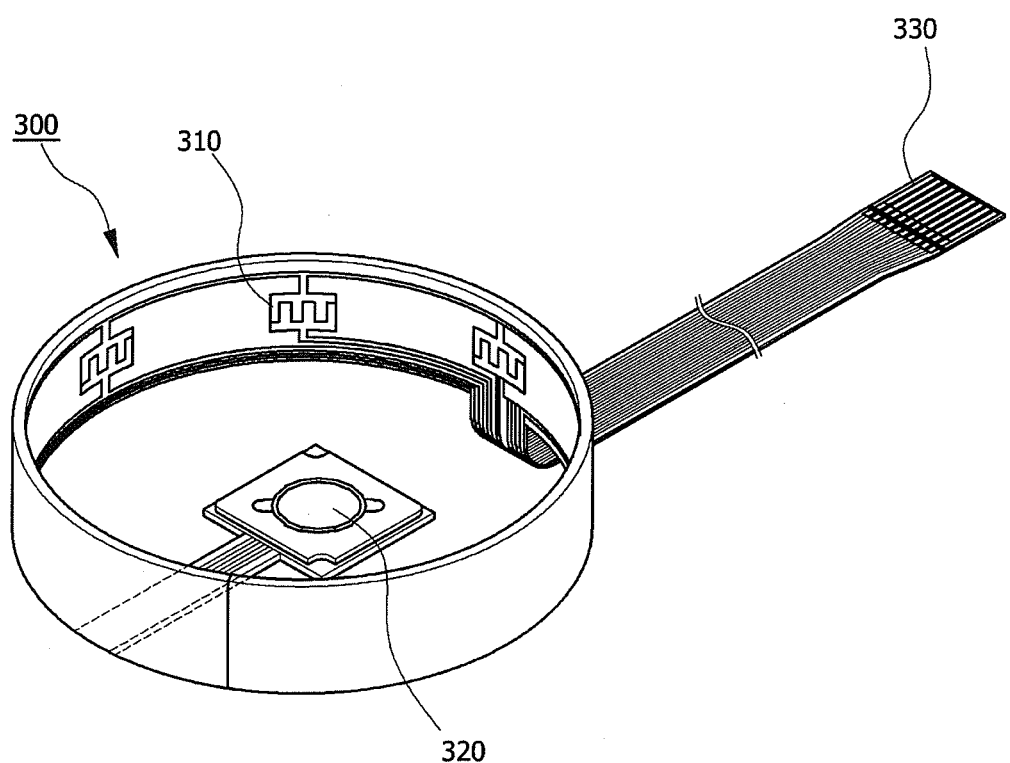
FIG. 5 is a perspective view illustrating the flexible printed circuit board included in the signal input device according to the embodiment of the present invention.

FIG. 4 is a deployed view illustrating the flexible printed circuit board 300 included in the signal input device according to the embodiment of the present invention, and FIG. 5 is a perspective view illustrating the flexible printed circuit board 300 included in the signal input device according to the embodiment of the present invention.

As shown in FIGS. 4 and 5, the flexible printed circuit board 300 included in the present invention is configured with a center line extending in a horizontal direction, and a first and a second branch lines and extending from the center line in a direction that crosses with a longitudinal direction of the center line, wherein the terminal switches 310 and a dome key 320 are formed on the center line and the first branch line, respectively, and a connector terminal 330 to transfer a current and a signal to the respective terminal switches 310 is formed on a free end of the second branch line. Each of the terminal switches 310 is configured with a positive terminal 312 and a negative terminal 314 having a concave-convex pattern in a vertical direction, the concave-convex patterns of the positive terminals 312 and the negative terminals 314 are arranged to be engaged each other as shown in the enlarged view of FIG. 4, and connection of the positive terminals 312 and the negative terminals 314 is more securely achieved when the conductor 400 comes in contact with the terminal switches 310. In addition, the positive terminals 312 and the negative terminals 314 are connected to the connector terminal 330 via positive lines 322 and a negative line 324, only one negative line 324 is provided to be connected to all negative terminals 314 and a negative pole of the dome key 320 and then extend to the connector terminal 330, and the positive lines 322 are independently connected to the respective positive terminals 312 and a positive pole of the dome key 320, respectively, and connected to the connector terminal 330. At this time, the terminal switches 310 and the dome key 320 are mounted in the inside of the housing 100 to be manipulated by the slide button 200 and a push button 500, and the connector terminal 330 is drawn out to the outside of the housing 100 through the housing 100 to allow parts disposed outside of the housing 100 to be electrically connected thereto.

The positive terminals 312 and the negative terminals 314 should be exposed to the outside to be in contact with the conductor 400. However, since there may be a short when the positive terminals 312 and the negative terminals 314 are electrically connected to other parts, the flexible printed circuit board 300 may further include a protective film 340 attached to cover a zone of the center line, in which the positive terminals 312 and the negative terminals 314 are disposed. In the case in that the plurality of the terminal switches 310 are arranged in a line along a longitudinal middle portion as shown in the embodiment of the present invention, the positive lines 322 and the negative line 324 should be disposed an upper side and a lower side of a point at which the terminal switches 310 are arranged, and the protective film 340 also should be attached to the upper side and the lower side of the point.

Meanwhile, it is preferred that the terminal switches 310 be arranged in a radial form about the vertical, central axis of the inner space so that the input signal generated depending a moving direction of the slide button 200 can be clearly distinguished. At this time, when the signal input device according to the present invention is configured to generate a movement signal to move a mouse cursor or a screen, the movement signal should be divided into, basically, front, rear, left, and right directions, and thus at least four terminal switches 310 should be provided. In addition, in the case in that a movement signal indicating a direction among the four directions, i.e., a diagonal direction is required to be generated, eight terminal switches 310 should be provided as shown in FIGS. 4 and 5. In the case in that movement signals indicating two diagonal directions between every two of the four directions are required to be generated, twelve terminal switches 310 should be provided. That is, it is preferred that the number of the terminal switches 310 provided on one flexible printed circuit board 300 be basically total four, one terminal switch 310 per one direction of the front, the rear, the left, and the right directions, and be added by a unit of 4, i.e. a multiple of 4.

Additionally, the signal input device according to the present invention may be configured to generate another type of the input signal by a downward force as well as the operation of laterally sliding the slide button 200. That is, the flexible printed circuit board 300 is provided with the dome key 320 mounted on the bottom surface of the housing 100, and the push button 500 is further provided, wherein the push button 500 has an upper end that is upwardly exposed to outside through the slide button 200, and a lower end that is mounted on the dome key 320 and is pushed downward to push the dome key 320 when the downward force is applied. At this time, if the entire push button 500 is configured to upwardly pass through the slide button 200, the push button 500 may be lost, and thus it is preferred that the push button 500 be configured to include a push rod 510 passing through a through hole 212 formed in the slide button 200, and a mounting portion 520 that is formed to have a greater horizontal area than the through hole 212 and is coupled to a lower end of the push rod 510.

Figure 6:
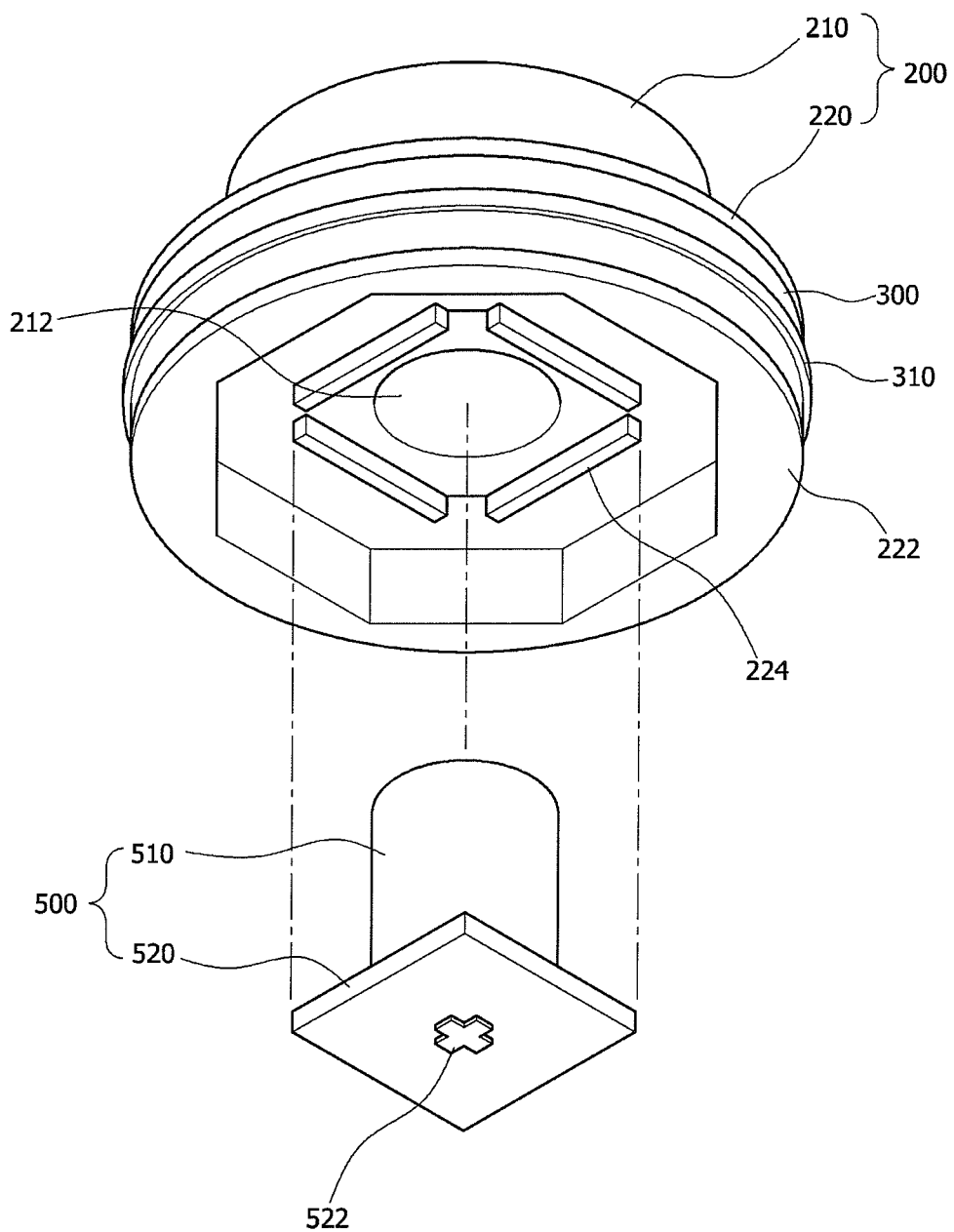
FIG. 6 is an exploded perspective view illustrating a coupling structure of a slide button and a push button included in the signal input device according to the embodiment of the present invention.

FIG. 6 is an exploded perspective view illustrating a coupling structure of the slide button 200 and the push button 500 included in the signal input device according to the present invention.

It is preferred that the mounting portion 520 is made in a plate form having a greater area than the through hole 212 of the slide button 200 so that the push button 500 can be moved downward, but not upward, in a state that the push rod 510 is inserted into the slide button 200. Further, the mounting portion 520 is made in a polygonal plate form, and guiding protrusions 224 protruding downward to come in contact with outer ends of the mounting portion 520 are further provided on the bottom surface of the slide button 200, so that a rotation of the push rod 510 about the vertical, central axis is prevented in a state that the push rod 510 is inserted into the through hole 212 of the slide button 200. In addition, a pressurizing protrusion 522 protruding downward may be further formed on a portion of the bottom surface of the mounting portion 520, corresponding to the dome key 320, so that the operating force downwardly pressurizing the push button 500 can be concentrated to push the dome key 320.

Figure 7:
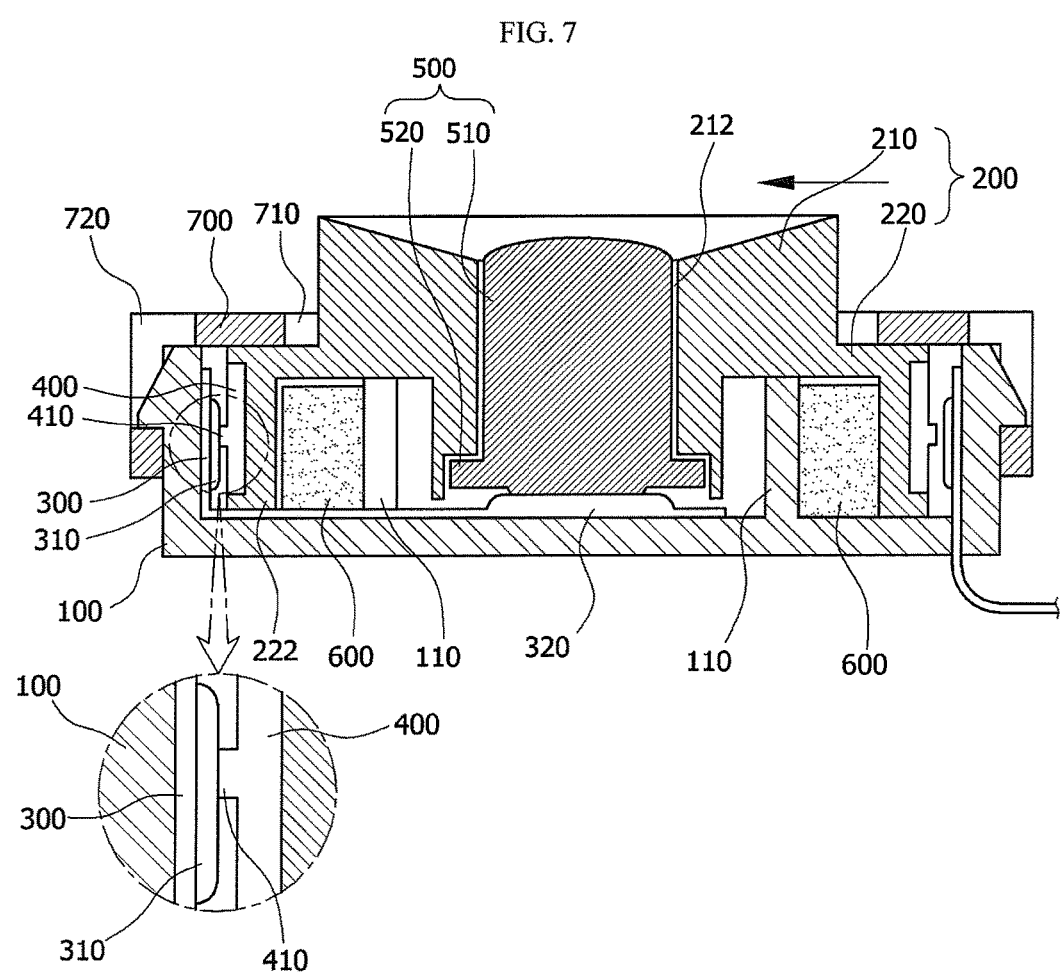
FIG. 7 is a cross sectional view illustrating the signal input device according to the embodiment of the present invention, wherein the slide button is laterally moved.

FIG. 7 is a cross sectional view illustrating the signal input device according to the present invention, wherein the slide button 200 is laterally moved, and FIGS. 8 to 11 are plan views illustrating patterns in which the conductor 400 comes in contact with the terminal switches 310 as the slide button 200 is laterally moved.

The terminal switches 310 are configured with the positive terminals 312 and the negative terminals 314 which are arranged to have portions alternately arranged in a horizontal direction, i.e. concave-convex patterns that protrude in the upward and downward directions, respectively, and engage to each other, and it is preferred that the conductor 400 come in contact with a point at which the positive terminals 312 and the negative terminals 314 are alternately arranged, in order to electrically connect the positive terminals 312 and the negative terminals 314. Further, a protruding end 410 protruding toward the terminal switches 310 may be formed on the conductor 400, so that the conductor 400 can be pressed with a greater pressure at the point at which the positive terminals 312 and the negative terminals 314 are alternately arranged, when the slide button 200 is laterally slid.

Like this, since a force laterally sliding the slide button 200 is concentrated to the protruding end 410 when the protruding end 410 is formed, there is an advantage in that the electric connection of the positive terminals 312 and the negative terminals 314, i.e. the connection of the terminal switches 310 can be made more securely. In particular, if a thick protective film 340 is further attached on the upper side and the lower side of the center line, the conductor 400 may only be pressed against the protective film 340, and may not come in contact with the terminal switches 310, when the conductor 400 without the protruding end 410 formed thereon is pressed toward the center line. However, when the protruding end 410 is formed on the conductor 400 as shown in this embodiment, the protruding end 410 can be pressed against the terminal switches 310 even if the thick protective film 340 is attached on the upper and the lower sides of the terminal switches 310, thereby having an advantage in that a reliability of the connection of the terminal switches 310 is remarkably increased. At this time, it is preferred that a plurality of protruding ends 410 be formed over an entire outer circumference of the conductor 400 so as to press the terminal switches 310 in respective directions.

Hereafter, an embodiment of operating the signal input device is described in detail with reference to FIGS. 8 to 11.

Figure 8:
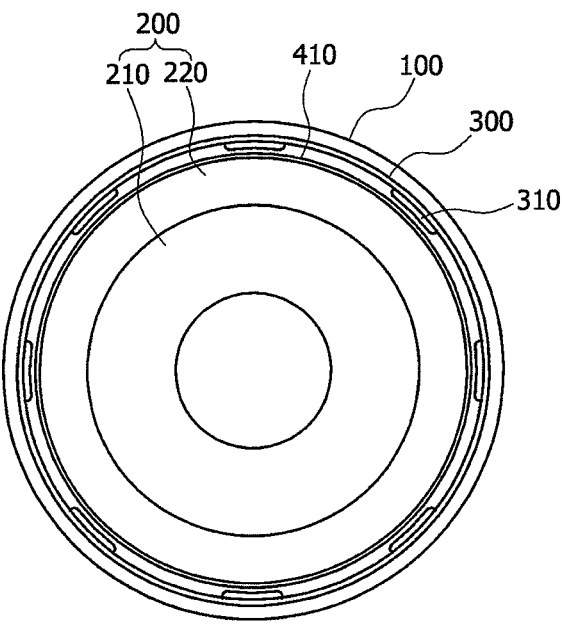
FIGS. 8 to 11 are plan views illustrating patterns in which a conductor comes in contact with terminal switches as the slide button is laterally moved.

As shown in FIG. 8, the protruding ends 410 formed on the conductor 400 are maintained in a state in which the protruding ends 410 are not connected to any one of the terminal switches 310, in a state in which no external force is applied to the signal input device according to the present invention.

Figure 9:
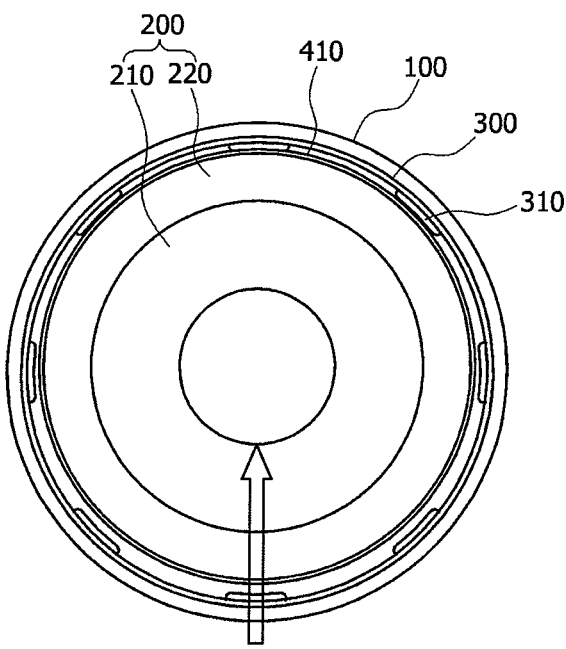

When the user slides the slide button 200 in a front direction from the state described above, the protruding end 410 presses the terminal switch 310 disposed in front of the protruding end 410 and connects the terminal switch 310 as shown in FIG. 9, and the signal input device according to the present invention generates the input signal allocated to the terminal switch 310 disposed in front of the protruding end 410. For example, if it is set to generate a movement signal of the mouse cursor when the terminal switches 310 are connected, the mouse cursor may be moved to a 12 o'clock direction in a monitor (not shown).

Figure 10:
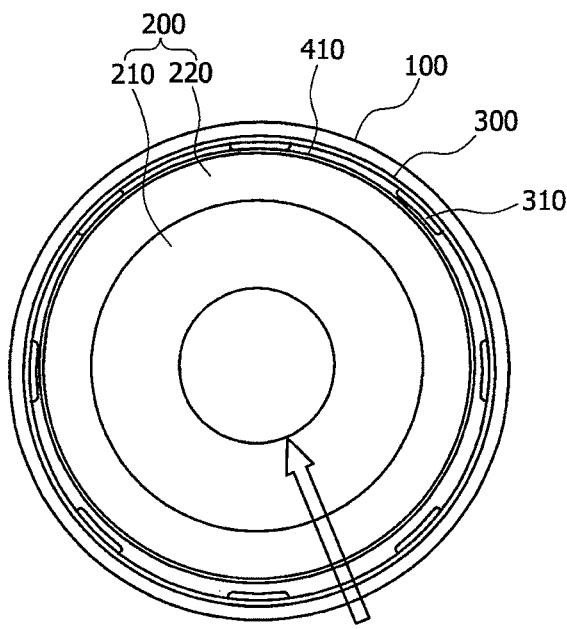
Figure 11:
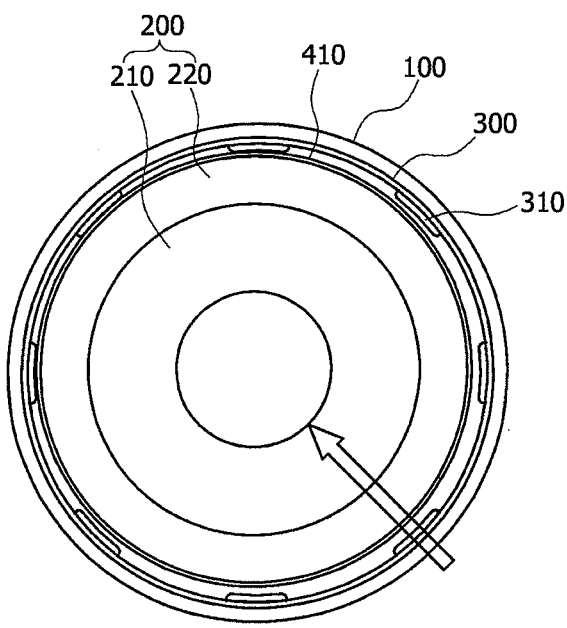

At this time, when the direction in which the user slides the slide button 200 is directed to a direction between the two terminal switches 310 as shown in FIG. 10, the protruding end 410 connects the terminal switch 310 located in front of the protruding end 410 to a terminal switch 310 located at a front, left side of the protruding end 410. When the two adjacent terminal switches 310 are connected as described above, a movement signal is generated to move the mouse cursor in a direction directed to the direction between the two terminal switches 310.

Further, when a force that laterally slides the slide button 200 is very large, three adjacent terminal switches 310 can be connected as shown in FIG. 8. In this case, a movement signal is generated to move the mouse cursor in a direction directed to the center of a region in which the connected terminal switches 310 are disposed, i.e. a direction directed to the center one of the connected terminal switches 310. In addition, when four adjacent terminal switches 310 are connected, a movement signal is generated to move the mouse cursor in a direction between two middle terminal switches 310.

When the slide button 200 is used to generate the signal which moves the cursor as described above, for example in the mouse, the push button 500 may be used as a button provided on the mouse. That is, the user may generate an executing signal by pushing the push button 500 twice in a row, may realize a function of drag and drop by sliding the slide button 200 with the push button 500 being pushed, and may realize other functions such as a screen scroll function and a screen enlargement/reduction function.

Figure 12:
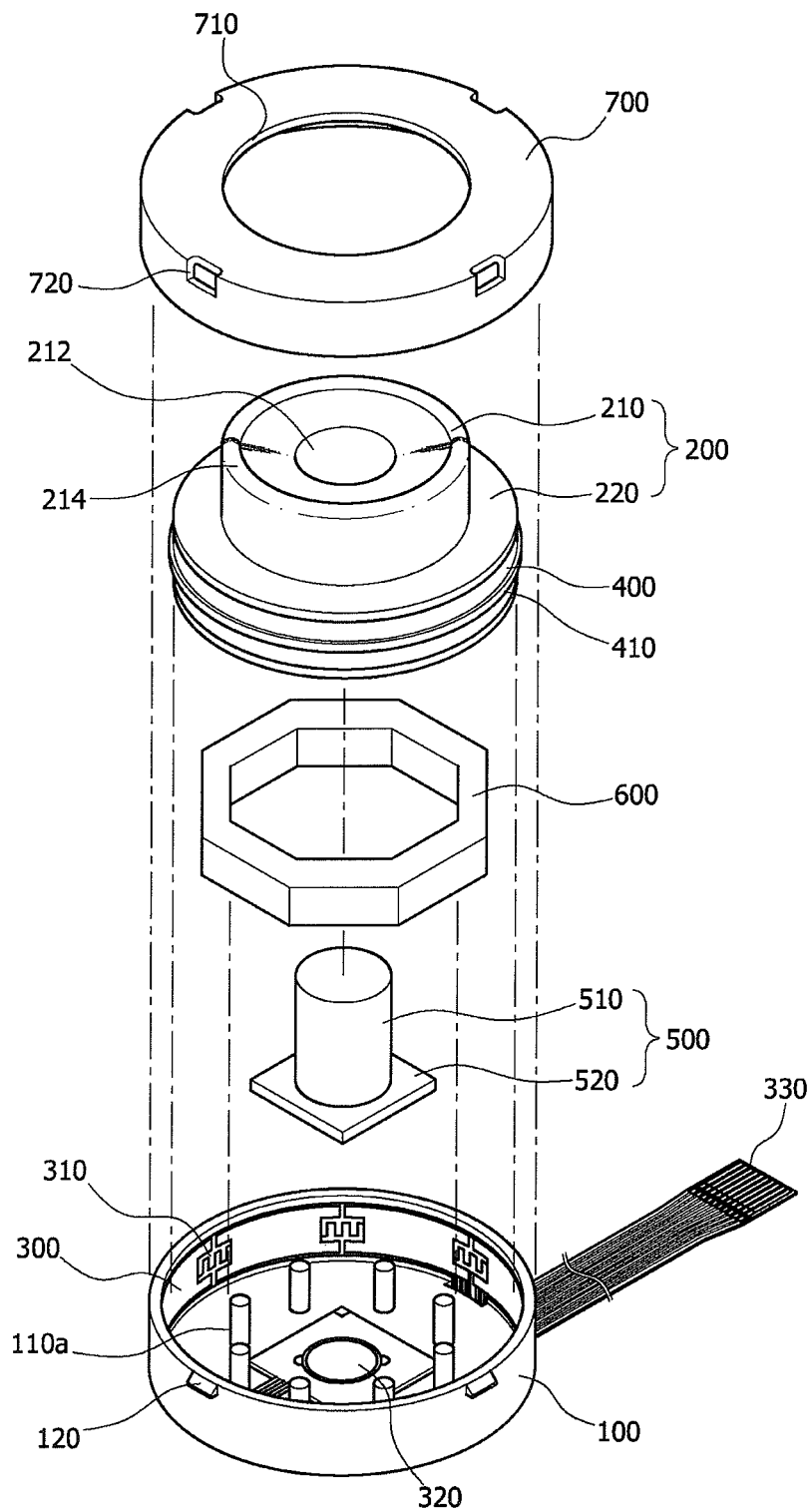
FIG. 12 is an exploded perspective view illustrating a signal input device according to a second embodiment of the present invention.
Figure 13:
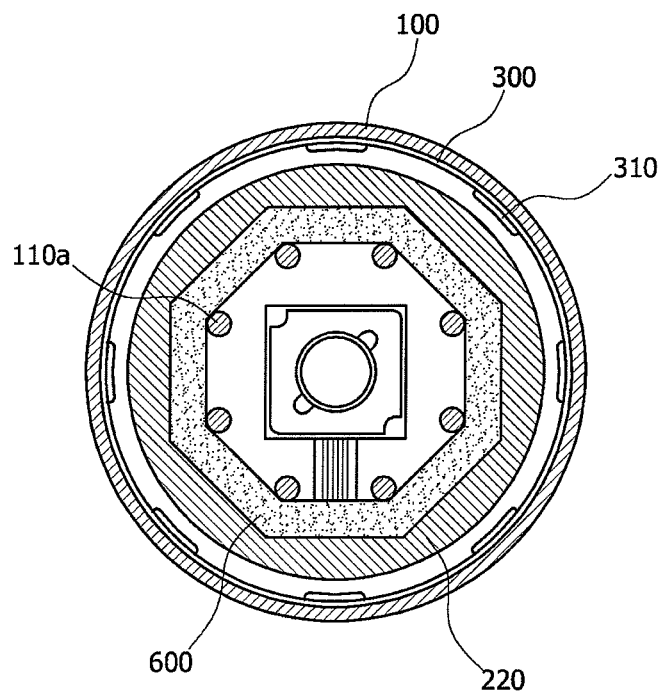
FIG. 13 is a horizontal sectional view illustrating an arranging structure of fixing rods which are included in the signal input device according to the second embodiment of the present invention.

FIG. 12 is an exploded perspective view illustrating a signal input device according to a second embodiment of the present invention, and FIG. 13 is a horizontal sectional view illustrating an arranging structure of fixing rods which are included in the signal input device according to the second embodiment of the present invention.

The fixing wall 110 which has a wall body form and supports the inner side of the elastic member 600 so as to allow the slide button 200 to be returned to its original position by an elastic force of the elastic member 600 can be replaced with a plurality of fixing rods 110a as shown in FIGS. 12 and 13. That is, in the signal input device according to the present invention, the plurality of the fixing rods 110a upwardly protruding so as to be spaced in a constant distance from the inner side of the lower sidewall 222 is formed on the bottom surface of the housing 100, and the elastic member 600 may be configured to be inserted between the inner side of the lower sidewall 222 and the plurality of fixing rods 110a. When the fixing wall 110 is replaced with the fixing rods 110a as described above, there is an advantage in that the slide button 200 can be easily operated with a small force, because a portion that is compressed by the elastic member 600 when the slide button 200 is laterally slid is small in size, the product can be easily designed, because a greater inner space of the housing 100 is obtained, and it is possible to reduce a weight of the product.

Meanwhile, when the fixing rods 110a is disposed at a side corresponding to the terminal switch 310, the terminal switch 310 may not be correctly connected, because the slide button 200 is swiveled left or right about the fixing rods 110a when the slide button 200 is slid toward the terminal switch 310. Accordingly, it is preferred that the planes of the inner side of the lower sidewall 222 are disposed at the sides corresponding to the terminal switches 310, the corners of the lower sidewall 222 are disposed at corresponding points between the two terminal switches 310, and the plurality of the fixing rods 110a are disposed at points corresponding to the corners of the inner side of the lower sidewall 222. When the fixing rods 110a are disposed at every point corresponding to the corners of the inner side of the lower sidewall 222 as shown in FIG. 13, there is an advantage in that the slide button 200 is not swiveled left or right when the user is sliding the slide button 200 in the front direction, because two most rear corners of the corners of the inner side of the lower sidewall 222 are supported against two most rear fixing rods 110a.

Meanwhile, if an upper surface of the slide button 200 is formed to have a generally even plane, a finger of the user may slip from the upper surface of the slide button 200, when the user laterally slides the slide button 200 in a state in that the user puts his or her finger on the upper surface of the slide button 200. Further, when the push button 500 is provided, the push button 500 may be pushed against the user' intention, while the user laterally slides the slide button 200 with his or her finger put on the upper surface of the slide button 200. Accordingly, it is preferred that an edge portion of the upper surface be formed higher than a central portion of the upper surface, so that a slippage in the horizontal direction and pushing of the push button 500 can be prevented, when the finger of the user is put on the upper surface of the slide button 200.

At this time, the slide button 200 may be formed to be inclined so that the upper surface is lowered toward the center of the upper surface, and a protrusion 214 protruding upward may further be provided on the edge portion of the upper surface. Of course, both forming the upper surface of the slide button 200 to be inclined and further providing the protrusion 214 may be applied simultaneously. There is an advantage in that if the edge portion of the upper surface of the slide button 200 is formed higher, the slide button 200 can be more easily operated and a malfunction of the slide button 200 can be reduced.

While the present invention has been described above using preferred embodiments of the present invention, the present invention is not limited to specific embodiments, and the present invention should be interpreted by the appended claims. It will be apparent to those skilled in the art that various modifications or alterations can be contrived and implemented within the scope described in the specification, and these modifications and alterations also fall within the technical scope of the present invention.

The invention claimed is:

1. A signal input device, comprising:
   a housing having an inner space with an opened upper side;
   a slide button mounted in the inner space;
   a flexible printed circuit board which is coupled to surround any one of an inner wall of the inner space and an outer sidewall of the slide button, and is provided with two or more terminal switches; and
   a contact area which is arranged to surround the other one of the inner wall of the inner space and the outer sidewall of the slide button, and the contact area being configured to come in contact with and connect the terminal switches when the slide button is moved in a lateral direction;
   wherein the flexible printed circuit board is provided with a dome key mounted on a bottom surface of the housing,
   wherein the signal input device further comprises a push button having an upper end passing upward through the slide button and a lower end mounted on the dome key.

2. The signal input device of claim 1, further comprising an elastic member configured to return a position of the slide button so that the terminal switches and the contact area are spaced from each other, after the slide button is moved in the lateral direction.

3. The signal input device of claim 2, wherein the slide button includes a lower sidewall extending downward from an outer end thereof,
   a fixing wall extending upward so as to face an inner side of the lower sidewall is formed on the bottom surface of the housing, and
   the elastic member is inserted between the lower sidewall and the fixing wall.

4. The signal input device of claim 3, wherein the inner side of the lower sidewall and an outer side of the fixing wall include a plurality of planes arranged and connected to each other to make a radial form about a vertical axis, and the elastic member comes in contact with the inner side of the lower sidewall and the outer side of the fixing wall.

5. The signal input device of claim 1, further comprising a cover coupled to cover an upper side of the housing, and
   wherein the slide button includes an upper end protruding upward through the cover, and a lower end that is coupled to a lower side of the upper end, is disposed in the inner space, and is provided with the flexible printed circuit board or the contact area at the outer sidewall thereof.

6. The signal input device of claim 1, wherein the terminal witches are arranged in a radial form about a vertical, central axis of the inner space.

7. The signal input device of claim 1, wherein the push button includes a push rod passing through a through hole formed on the slide button, and a mounting portion that is formed to have a greater horizontal area than the through hole and is coupled to a lower end of the push rod.

8. The signal input device of claim 1, wherein the flexible printed circuit board includes a center line extending in a horizontal direction and first and second branch lines extending from the center line in a direction that crosses with a longitudinal direction of the center line, the terminal switches are formed on the center line, the dome key is formed on the first branch line, and a connector terminal is formed on a free end of the second branch line.

9. The signal input device of claim 8, wherein the free end of the second branch line is drawn out to outside of the housing by passing through the housing.

10. The signal input device of claim 1, wherein protrusions are formed on any one side of the slide button and the housing and inserting holes into which the protrusions can be inserted are formed on the other side of the slide button and the cover, thereby a rotation of the slide button being prevented.

11. The signal input device of claim 1, wherein the contact area is a conductor.

12. The signal input device of claim 11, wherein the terminal switches are configured with positive terminals and negative terminals which are arranged to have portions alternately arranged in a horizontal direction, and
    a protruding end is formed at a position on the conductor, wherein the position corresponds to a point at which the positive terminals and the negative terminals are arranged to cross to each other.

13. The signal input device of claim 12, wherein the protruding end is formed over an entire circumference of an outer surface of the conductor.

14. A signal input device comprising:
    a housing having an inner space with an opened upper side;
    a slide button mounted in the inner space;
    a flexible printed circuit board which is coupled to surround any one of an inner wall of the inner space and an outer sidewall of the slide button, and is provided with two or more terminal switches;
    a contact area which is arranged to surround the other one of the inner wall of the inner space and the outer sidewall of the slide button, and the contact area being configured to come in contact with and connect the terminal switches when the slide button is moved in a lateral direction; and
    an elastic member configured to return a position of the slide button so that the terminal switches and the contact area are spaced from each other, after the slide button is moved in the lateral direction,
    wherein the slide button includes a lower sidewall extending downward from an outer end thereof,
    wherein a plurality of fixing rods protruding upward so as to space the housing in a constant distance from an inner side of the lower sidewall are formed on a bottom surface of the housing, and
    wherein the elastic member is inserted between the inner side of the lower sidewall and the plurality of fixing rods.

15. The signal input device of claim 14, wherein the inner side of the lower sidewall includes a plurality of planes arranged and connected to each other so as to define a radial form about a vertical axis.

16. A signal input device comprising:
    a housing having an inner space with an opened upper side;
    a slide button mounted in the inner space;
    a flexible printed circuit board which is coupled to surround any one of an inner wall of the inner space and an outer sidewall of the slide button, and is provided with two or more terminal switches; and
    a contact area which is arranged to surround the other one of the inner wall of the inner space and the outer sidewall of the slide button, and the contact area being configured to come in contact with and connect the terminal switches when the slide button is moved in a lateral direction, wherein a movement signal is generated when the terminal switch is connected, wherein when one terminal switch is connected, a movement signal indicating a direction in which that terminal switch is positioned is generated, and when two adjacent terminal switches are connected, a movement signal indicating a direction directing a center between regions at which the connected terminal switches are disposed is generated, wherein a movement signal indicating a direction directing a center among regions at which the connected terminal switches are disposed is generated, when at least three adjacent terminal switches are connected.

17. A signal input device, comprising:

a housing having an inner space with an opened upper side;

a slide button which is mounted on the upper side of the housing and provided with a lower sidewall extending downward therefrom so as to space the slide button from an outer sidewall of the housing;

a flexible printed circuit board which is coupled to surround any one of the outer sidewall of the housing and an inner side of the lower sidewall, and is provided with two or more terminal switches; and a contact area which is arranged to surround the other one of the outer sidewall of the housing and the inner side of the lower sidewall, and the contact area being configured to come in contact with and connect the terminal switches when the slide button is moved in a lateral direction;

wherein the flexible printed circuit board is provided with a dome key mounted on a bottom surface of the housing, and wherein the signal input device further comprises a push button having an upper end passing upward through the slide button and a lower end mounted on the dome key.

18. The signal input device of claim 17, further comprising an elastic member configured to return a position of the slide button so that the terminal switches and the contact area are spaced from each other, after the slide button is moved in the lateral direction.

19. The signal input device of claim 17, wherein the contact area is a conductor.

* * * * *